United States Patent [19]

Ojima

[11] Patent Number: 4,983,144
[45] Date of Patent: Jan. 8, 1991

[54] BELT OR CHAIN TENSIONER

[75] Inventor: Juji Ojima, Kanagawa, Japan

[73] Assignee: NHK Spring Co., Ltd., Yokohama, Japan

[21] Appl. No.: 446,144

[22] Filed: Dec. 5, 1989

[30] Foreign Application Priority Data

Dec. 29, 1988 [JP] Japan ................. 63-331953

[51] Int. Cl.$^5$ ............................. F16H 7/08
[52] U.S. Cl. ..................... 474/111; 267/70; 267/166; 474/138
[58] Field of Search ........... 474/109, 111, 136, 138, 474/101, 117, 115, 113; 267/69, 70, 71, 166

[56] References Cited

U.S. PATENT DOCUMENTS

| | | | |
|---|---|---|---|
| 99,475 | 2/1870 | Rhinelander | 267/166 |
| 2,779,586 | 1/1957 | Schweiss | 267/71 |
| 3,120,951 | 2/1964 | Finch | 267/70 |
| 3,704,877 | 12/1972 | Nunes et al. | 267/166 |
| 4,702,726 | 10/1987 | Ojima et al. | 474/138 X |
| 4,722,720 | 2/1988 | Ojima et al. | 474/138 X |
| 4,863,417 | 9/1989 | Kimata et al. | 474/138 X |

*Primary Examiner*—Thuy M. Bui
*Attorney, Agent, or Firm*—Fleit, Jacobson, Cohn, Price, Holman & Stern

[57] ABSTRACT

In a tensioner in which a tension rod advances from a casing to provide a tension to a chain or the like, the advancement of the tension rod is locked by inserting a pin into a hole formed in a portion where the rod is drawn out and further the drawn out portion of the tension rod is supported by a bearing portion formed at the bottom of the casing to stabilize the advancement of the rod.

2 Claims, 2 Drawing Sheets

(a)

(b)

BELT OR CHAIN TENSIONER

BACKGROUND OF THE INVENTION

This invention relates to a tensioner which maintains a belt or a chain of an internal combustion engine in a suitable tension state.

In the tensioner, a tension rod energized by a spring force abuts against a belt, chain or the like, directly or indirectly through a pulley, thereby providing a fixed stress to the belt or the chain by the urged spring force. For this purpose, in a fundamental construction of the tensioner, a tension rod is provided in a casing so as to be able to be advanced. A spring for advancing the tension rod is provided in the casing.

However, since such tensioner is energized by a spring, there is the danger of unexpected advancement of the tension rod and the projecting from the casing of the tension rod before assembling of the device or at time of removing the tension rod from the device. For this purpose, the tensioner is provided with a stopper mechanism which locks the advancement of the tension rod. In the traditional stopper mechanism, a pin hole having a small diameter is formed in each tensioner and the casing. The advancement of the tension rod is locked by inserting the stopper pin into each pin hole of the tensioner and the casing in the connecting state of the pin hole.

After assembling the tensioner to the device, the urging operation of the tension rod due to the spring force is performed by withdrawing the stopper pin to remove the locking of the tension rod.

In the traditional stopper mechanism when the stopper pin is withdrawn, it is necessary to position the casing for inserting the stopper pin in the pin hole of the tension rod. However, this positioning is very difficult. Further, the locking portion of the stopper pin is only one portion with respect to the advancing direction of the tension rod and the locking of the tension rod at an arbitrary position is impossible.

Further, when the tension rod is advanced, the rod portion supported by the casing is decreased, which causes instability of the operation of the rod. This invention is an improvement in view of the above casses, and provides a tensioner where it is possible to lock the tension rod at an arbitrary position easily and securely by a simple operation.

SUMMARY OF THE INVENTION

In order to achieve this object, this invention is provided with a stopper pin in a tension rod having a longer tension rod than usual. In other words, this invention is characterized in that in a tensioner which provides tension to a belt, chain or the like by advancing a tension rod from a casing by a spring force, a portion of said tension rod is withdrawn in an anti-advancing direction from the casing, said drawn out portion being supported slidably in a bearing formed at a bottom of the casing and a plurality of penetrated holes being formed in this drawn out portion.

The advancement of the rod is locked by inserting a pin in the penetrated hole formed in the drawn out portion of the tension rod. Further, the advancing operation of the rod is stabilized by supporting the drawn out portion of the tension rod with the bearing portion formed at the bottom of the casing.

BRIEF DESCRIPTION OF THE DRAWINGS

FIG. 4a is a section of coil spring strands. FIG. 4b is a sectional view of FIG. 4a.

DETAILED DESCRIPTION OF THIS INVENTION

Figure 1:
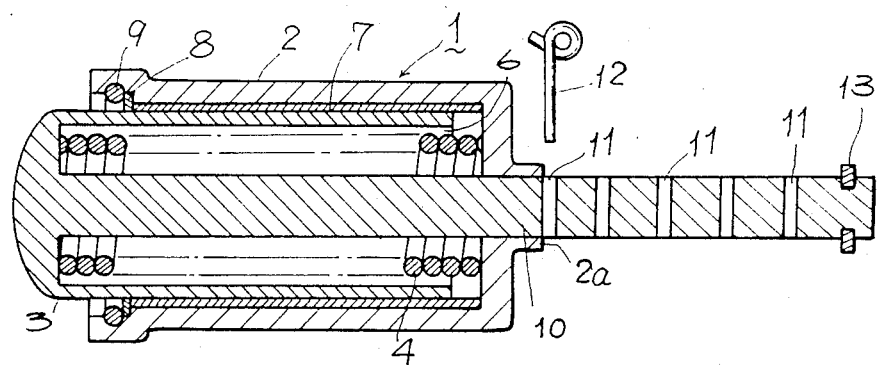
FIGS. 1, 2 and 3 are respectively a sectional view, a side view and a partial elevation view of an example of this invention.
Figure 2:
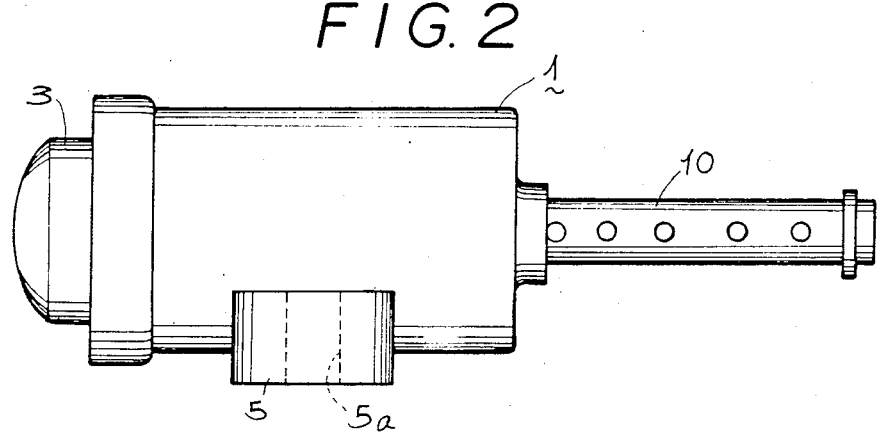
Figure 3:
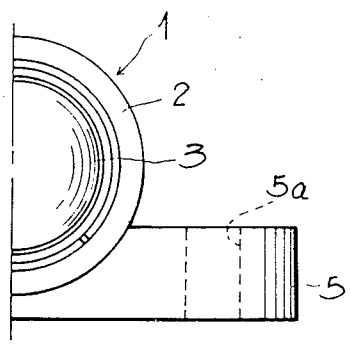

FIGS. 1 to 3 represent an example of this invention. The tensioner 1 includes a tension rod 3. A compression spring 4 is located within a casing 2 having a cylindrical shape.

The end (left side) of the casing 2 is open. The casing being attached to a device by an attaching piece 5 which extends to one side and is provided at a surface of the casing. A hole 5a for attaching is penetrated by a bolt.

The top end of the tension rod 3 abuts against the belt or the chain, directly or indirectly, is formed in an arc form. A hole 6 defined in an axial direction of the tension rod. The tension rod 3 is inserted into the casing 2 and energized to advance in the left direction due to the compression spring 4 described hereafter. By this advancement, the belt or the chain is biased to maintain a fixed tension. In order to perform such advancement of the tension rod 3 stably without swaying, a cylindrical guide 7 is interposed between the casing 2 and the tension rod 3. In FIG. 1, a bearing 8 supports the advancement of the tension rod 3 at the side of the casing 2. The withdrawing of the tension rod 3 is stopped by inserting a snap ring 9 in a opening at the side of the casing 2.

The compression spring 4 is inserted into the hole 6 of the tension rod. The top end of the compression spring 4 abuts against the back surface at the top end of the tension rod 3, while a bottom end thereof abuts against the bottom of the casing 2. The tension rod 3 is energized in the advancing direction by the spring force. In this case, the energizing direction of the compression spring 4 is the same direction as the advancing direction of the tension rod whereby the tension rod 3 is adapted to advance. When a reaction force occurs due to excessive tension of the belt or the chain from the compression spring, the belt or the chain deflects to make tension rod 3 be able to prevent excess tension on the belt or the like.

In addition to the above construction, a shaft 10 is extended from a central portion of the tension rod 3. The shaft 10 extends into the hole 6 from the back side of the top end of the tension rod 3 and further extends rearwardly from the end of the hole 6. In other words, the shaft 10 extends in the opposite direction against the advancing direction of the tension rod 3, the end portion thereof being drawn out rearwardly from the casing 2 by penetrating the bearing 2a formed at the bottom of the casing 2. In the drawn out portion of the shaft 10 is formed holes 11 having a small diameter at a fixed separation distance. The stopper pin 12 is inserted into a hole 11 and the advancement of the tension rod is locked by the insertion of the stopper pin 12. On the other hand, the advancement of the tension rod 3 is still possible by pulling out the stopper pin 12. In such a construction, wherein the shaft 10 which is a portion of the tension rod 3 is supported by the bearing 2a and the hole 11 is formed in the shaft 10, the advancing operation of the tension rod 3 is stabilized and the advancing thereof can be locked by the insertion of the stopper pin 12 into any one of holes 11. Accordingly, the tension rod 3 which is in an advancing state is easily locked at the time of taking out of the tensioner for maintenance and the like, which makes the maintenance operation and the removing operation easy. Further, the locking of advancement of the tension rod 3 is possible only by inserting the stopper pin 12 into the hole 11 of the drawn out shaft from the casing, which makes it not necessary to insert a pin through the tension rod and the casing. In FIG. 1, preventive piece 13 enables drawing out of the tension rod 3 when it is inserted into the base side of the shaft 10. This piece stops the drawing out of the tension rod 3 caused by excess advancement towards the bottom of the casing 2.

Figure 4:
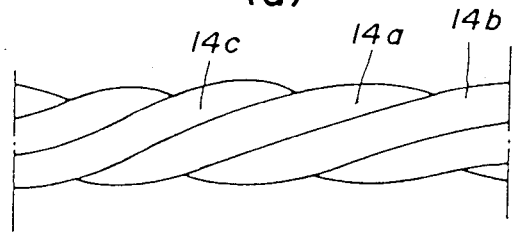
Figure 4:
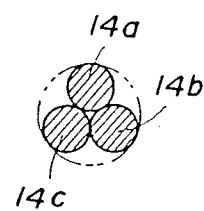

In this invention, the compression spring 4 a spring may be used which is coiled by twisting a plurality of element wires 14a, 14b, 14c as is shown in FIGS. 4a and 4b. The twisted spring has friction between each element wire thereby being able to effectively decrease the resonant energy of the belt or the chain.

As described above the tension rod in this invention is drawn out from the casing, the drawn out portion of the tension rod being supported by the bearing formed at the bottom of the casing. Accordingly, the operation thereof is stabilized irrespective of an amount of the tension rod withdrawn. Further, a plurality of holes are formed in the drawn out portion to enable the insertion of a stopper pin into an arbitrary hole. Therefore, locking of tension rod is possible at a suitable position in an advancing state whereby the maintenance operation is safe and easy.

What I claim is:

1. A tensioner for providing a tension to a belt, chain and the like, said tensioner comprising:

a casing, a tension rod slidably mounted in said casing and biased by a spring force within a hole of said tension rod by a spring having one end engaging a base of said casing and an opposite end engaging a top end of said tension rod, a shaft of said tension rod extending from said top end of said tension rod toward said base of said casing, a bearing defined by said base of said casing for slidably supporting said tension rod through said base of said casing, a portion of said shaft of said tension rod drawn out from said base of said casing in a direction opposite to a direction in which said tension rod is biased, said drawing out portion being supported slidably in said bearing formed in said base of said casing, a plurality of holes formed in said portion of said shaft of said tension rod drawn out from said base of said casing, and a stopper pin being located in one of said holes to lock said tension rod in an arbitrary position for maintenance of said tensioner with ease and in safety.

2. A tensioner according to claim 1, wherein said spring is coiled by twisting a plurality of elements wires.

* * * * *